Nov. 15, 1966   R. E. KUBA   3,286,159
CURRENT SUPPLY APPARATUS EMPLOYING ELECTRIC WAVEFORM CONVERSION
Filed Feb. 11, 1963                                         5 Sheets-Sheet 1
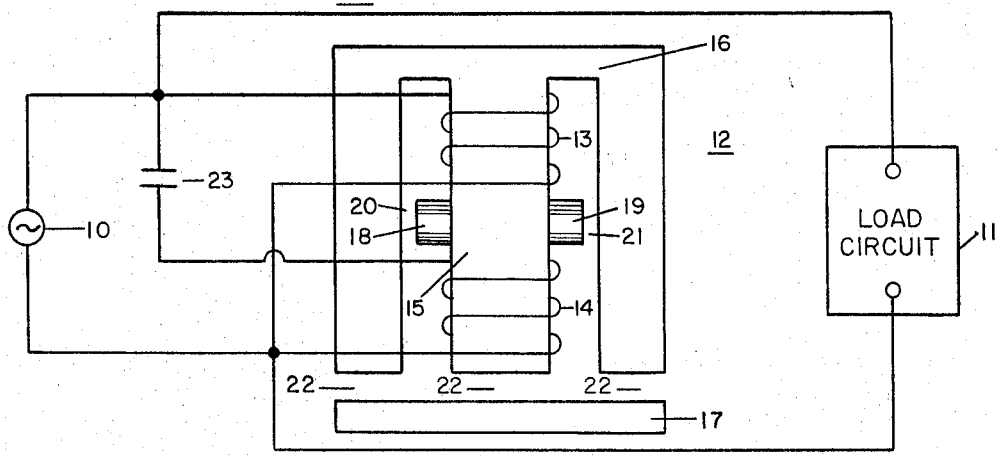
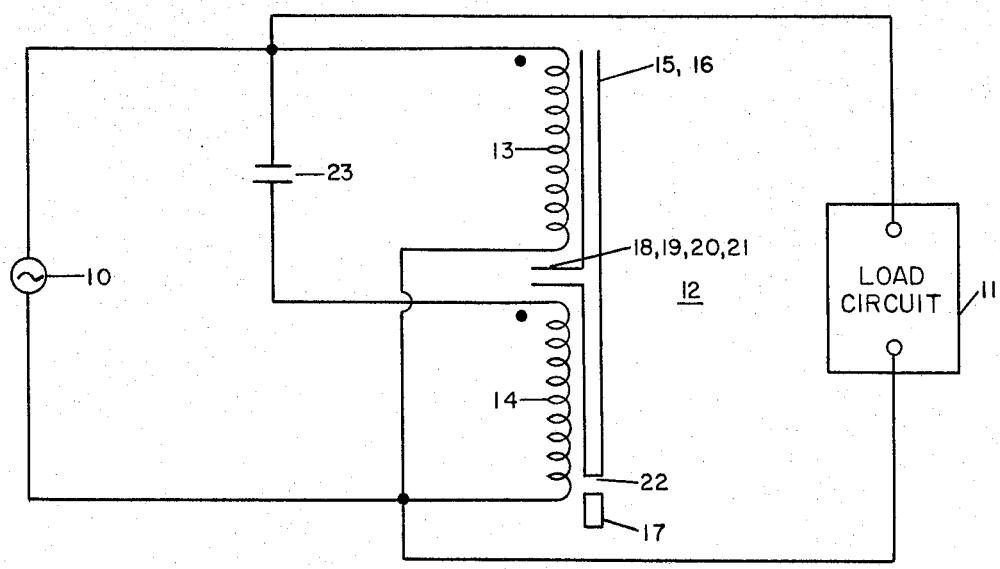
INVENTOR.
RICHARD E. KUBA

INVENTOR.
RICHARD E. KUBA

INVENTOR.
RICHARD E. KUBA

INVENTOR.
RICHARD E. KUBA

United States Patent Office 3,286,159
Patented Nov. 15, 1966

3,286,159
CURRENT SUPPLY APPARATUS EMPLOYING
ELECTRIC WAVEFORM CONVERSION
Richard E. Kuba, Columbus, Ohio, assignor to North
Electric Company, Galion, Ohio, a corporation of Ohio
Filed Feb. 11, 1963, Ser. No. 257,659
19 Claims. (Cl. 323—45)

This invention relates to current supply apparatus and more particularly to apparatus for providing a substantially sinusoidal or harmonic free output voltage waveform derived from an alternating current supply source having a plurality of frequency components.

It is a further object of the invention to provide improved apparatus having an output voltage which, in addition to being substantially sinusoidal, is also substantially constant irrespective of variations of the magnitude or waveshape of the input voltage over a certain range.

Another object is to provide improved apparatus having an output voltage which, in addition to being substantially sinusoidal, is substantially constant irrespective of variations in the impedance of a load to which current is supplied from this output voltage.

In accordance with the invention, specific embodiments of which are herein described for the purpose of illustration, there is provided for supplying current to a load, an alternating current supply source having a plurality of frequency components. The amplitudes, relative phase positions, and frequencies of the frequency components may change. Moreover, the resistance or reactance, or both, of the load may also change. The alternating current may be supplied, for example, from the output of a line voltage regulator of the permanent type to the input of which is supplied current from a commercial source of alternating current. In one form of the invention, there is provided a transformer comprising in combination, a core, a primary winding and a secondary winding on the core, a high reluctance magnetic shunt placed between the primary and secondary windings, and a second high reluctance magnetic path forming a return magnetic path for magnetic flux which links only the secondary winding.

Current is supplied from the supply source or line regulator to the transformer primary winding which is connected across the supply source. There is provided a capacitor which is connected in series with the transformer secondary winding. Current from the supply source or line regulator is supplied to a shunt current path comprising in series, the transformer secondary winding and the capacitor. The load is connected in shunt with the series combination of the capacitor and the transformer secondary winding. The capacitance of the capacitor, the transformer primary winding turns, the transformer secondary winding turns, the reluctance of the magnetic shunt path, and the reluctance of the magnetic return path have values such that the voltage which appears across the transformer secondary winding is substantially proportional to the second derivative of the voltage which appears across the capacitor. Because of this second derivative relationship, the transformer secondary winding voltage will contain the same harmonic voltages as the capacitor voltage. Moreover, the harmonic voltages of the transformer secondary winding voltage will be amplified in magnitude and have phase opposition to the corresponding harmonic voltages of the capacitor voltage. The harmonic voltages appearing across the transformer secondary winding will, in accordance with the invention, substantially cancel the harmonic voltages appearing across the capacitor so that the series combination of the capacitor voltage and the transformer secondary voltage will be substantially sinusoidal at the fundamental frequency and hence produce a nearly harmonic free output voltage waveform at the load.

These and other objects and features of the invention will be best understood by reference to the following description taken in connection with the accompanying drawings, in the several figures of which like reference numerals identify like elements, and in which:

FIGURE 1a is a sectional view of a current supply circuit embodying the invention;

FIGURE 1b is a schematic representation of the current supply circuit depicted in FIGURE 1a;

FIGURE 2 is a sectional view of a modification of the current supply circuit shown in FIGURE 1a;

Figure 2:
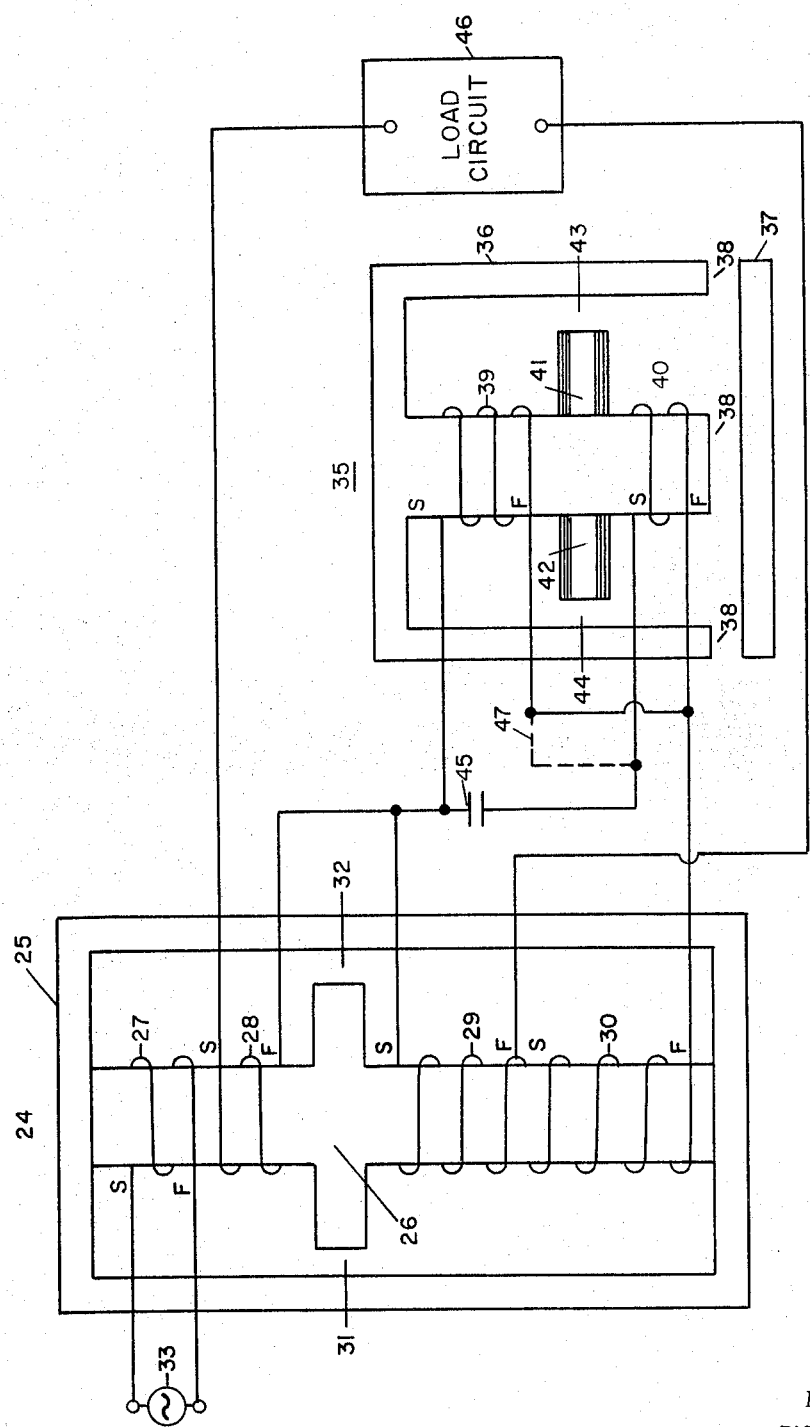

Referring now to the drawings, there is shown in FIGURE 1a, a source of non-sinusoidal alternating current 10 for supplying current to a load circuit 11. It is important to note that the source 10 is a non-sinusoidal current source and not a non-sinusoidal voltage source. That is, source 10 provides a plurality of frequency components in the current it provides at its output terminals. The voltage across source 10, which is the same as the voltage across load circuit 11, is free to be adjusted in harmonic content through the operation of circuitry 10a connected in shunt with source 10, which circuitry will now be described.

As shown in FIGURE 1a the apparatus includes a transformer 12 having a primary winding 13 and a secondary winding 14 wound on a core 15 which core may be made of laminations in the form shown and made of suitable material such, for example as 29 gauge grain-oriented silicon steel.

The core, as shown, consists of E-shaped laminations 16, I-shaped laminations 17, and I-shaped laminations 18 and 19 which are butt jointed at the center leg of the E-shaped laminations and run transverse to the direction of the center leg of the E-shaped laminations 16. The I-shaped laminations 18 and 19 form a magnetic shunt path which is deposed between primary winding 13 and secondary winding 14. There are provided non-magnetic gaps 20 and 21 for adjusting the reluctance of the magnetic shunt paths formed by I-shaped laminations 18 and 19. A non-magnetic gap 22 separates the E-shaped laminations 16 from the I-shaped laminations 17 for adjusting the reluctance of the magnetic path which forms a return path for magnetic flux which links the secondary winding 14. The primary winding 13 is connected across the supply source 10. A capacitor 23 connected in series with the secondary winding 14 provides a shunt current path across the supply source 10.

FIGURE 1b is a schematic representation of the current supply circuit depicted in FIGURE 1a and will be used for purposes of simplification in presenting schematic representations of modifications of the current supply circuit shown in FIGURE 1a.

The principle of operation of the invention may be explained as follows with reference to FIGURE 1a. A portion of the non-sinusoidal alternating current provided by the current supply source 10 will flow through capacitor 23 and thereby produce a voltage across capacitor 23 which is also non-sinusoidal.

The capacitance of capacitor 23, the turns of primary winding 13, the turns of secondary winding 14, the reluctance of the magnetic shunt paths comprising I-shaped laminations 18 and 19 along with non-magnetic gaps 20 and 21, and the reluctance of the magnetic path formed by I-shaped laminations 17 and non-magnetic gaps 22 are adjusted to values such that the voltage across secondary coil 14 is substantially proportional to the second derivative of the voltage which appears across capacitor 23. The voltage appearing across winding 14 is, therefore, high in harmonic content, consisting of the same harmonics which are present in the voltage across capacitor 23. Moreover the harmonics in the voltage across winding 14 are amplified in magnitude and are in phase opposition to the corresponding harmonics which appear in the voltage across capacitor 23.

Now in FIGURE 1a, the voltage across the load circuit is equal to the sum of the voltage across capacitor 23 and the voltage across transformer secondary winding 14. Because of the phase opposition and the enhancement of the harmonics in the voltage across winding 14, by adjusting the value of the capacitance of capacitor 23, the turns of primary winding 13, the turns of secondary winding 14, etc., as noted above the harmonic voltages of $v_c$ and $v_{14}$ will, in accordance with the invention, substantially nullify each other without reducing the amplitude of the fundamental component of output voltage to any great extent. Hence, the voltage appearing across load circuit 11 can be made substantially sinusoidal at the fundamental frequency.

It should be noted that the voltage $v_{14}$ is never exactly equal to the second derivative of $v_c$ because of nonlinear effects particularly for the higher frequency components. However, the first two or three harmonic components are usually the predominate components.

Control of the amplitudes of the higher harmonic components which appear in transformer secondary voltage $v_{14}$ is obtained through proper design of transformer primary winding 13, shunt paths 18 and 19, and air gaps 20 and 21.

Referring now to the embodiment of the invention shown in FIGURE 2, there is provided a ferroresonant voltage regulator 24 the core structure of which comprises the outer O-shaped laminations 25 and the inner T-shaped laminations 26. Windings 27, 28, 29, and 30 are placed in position upon the stackup of T-shaped laminations 26, as shown, and the assembly of T-shaped laminations 26 and windings 27, 28, 29, and 30 is then pressed into position inside the similar stackup of O-shaped laminations 25. Air gaps 31 and 32 are in a shunt magnetic flux path. Winding 27 is connected to a source of commercial alternating current 33 which, for example, may be a 115 volt, 60 cycle per second source.

There is further provided a transformer 35 having a core comprising a 2⅝" stackup of EI–175, 29 gauge, laminations 36 and 37 of grain-oriented silicon steel, butt jointed with an air-gap 38 of 0.050". A primary winding 39 and a secondary winding 40 are wound on the middle leg of the three legged core formed by the laminations 36 and 37. Winding 39 has 400 turns of No. 22 wire, and winding 40 has 286 turns of No. 17 wire. There are provided magnetic shunt paths 41 and 42 made up of a ⅝" stackup, each of 29 gauge, grain-oriented silicon steel laminations each deposed between windings 39 and 40. Each individual lamination comprising the shunt paths 41 and 42 has dimensions 2¾" x 0.865" x .014", with the 0.865" dimension lying between the center leg and an outside leg of lamination 36. Air gaps 43 and 44 are 0.010" each.

A capacitor 45 having a capacitance of 10 mfd. has one terminal connected to the start S of winding 29, the start S of winding 39 and the terminating end F of winding 28. The other terminal of capacitor 45 is connected to the start S of winding 40. The terminating end F of winding 40 is connected to the terminating end F of winding 30 and the terminating end F of winding 39. The load circuit 46 which, for example, may be both resistive and reactive, is connected to the start S of winding 28 and the terminating end F of winding 29. The capacitor 45 is made to serve a dual purpose, functioning first of all, as the resonating capacitor for the ferroresonant transformer 24 and secondly in combination with transformer 35 as a part of the waveform improvement circuit previously described with reference to FIGURE 1a. The combination of capacitor 45 and windings 29 and 30 produces a ferroresonant condition of operation in the regulator 24.

It is well known that ferroresonant regulators of the type depicted in FIGURE 2 will, when operating at a constant frequency, maintain a substantially constant root mean-square output voltage irrespective of large changes in the input voltage or large changes in the load impedance. This is particularly true if winding 28 shown in FIGURE 2, which is often referred to as a compensating winding, is utilized as shown to improve the regulation of the output voltage.

It is also well known that ferroresonant regulators of the type depicted in FIGURE 2 produce an output voltage waveform which is non-sinusoidal containing a plurality of harmonic components. For example, a harmonic analysis at full load condition would indicate, typically, the following harmonic maximum voltages expressed as percentage of the fundamental maximum voltage; third harmonic 19.7 percent, fifth harmonic 8.9 percent, seventh harmonic 3.4 percent, ninth harmonic 2.2 percent, eleventh harmonic 1.4 percent.

The novel combination of the ferroresonant transformer 24, the capacitor 45 and the transformer 35 produces an output voltage waveform which is not only substantially sinusoidal but also substantially constant irrespective of large changes in the input voltage or large changes in the load impedance. The voltage across winding 40 is very high in harmonic content being substantially proportional to the second derivative of the capacitor voltage. The series combination of the voltage across capacitor 45 and the voltage across winding 40 yields, because of the nullifying effect of the corresponding harmonic components, as explained in the discussion of FIGURE 1a, a nearly sinusoidal voltage across windings 29 and 30.

The voltage across winding 29 has, of course, the same waveshapes as the voltage across the entire winding 29 and 30. Thus, the voltage waveshape across load 46 which is the sum of the voltage across windings 29 and 28 will also be substantially sinusoidal because the voltage across winding 28 will have the same waveshape as the input voltage and therefore will be substantially sinusoidal, the voltage across winding 29 has been shown to be substantially sinusoidal, and it is well known that the instantaneous sum of any two sinusoidal voltages of the same frequency is also a sinusoidal voltage of the same frequency.

The circuit of FIGURE 2 was tested first at a zero load condition and second at a full load condition for input voltages of 115 and 126 volts, 60 cycles per second respectively, which were maintained constant. The following chart presents the R.M.S. output voltages and the maximum value of the 3rd, 5th, 7th, 9th, 11th, 13th, and 15th harmonics in the output voltage expressed as a percentage of the maximum value of the fundamental component of the output voltage taken arbitrarily as 100 percent.

| Input R.M.S. Volts | Output R.M.S. Volts | Output R.M.S. Amps. | Percent Funda- mental | Percent | | | | | | |
|---|---|---|---|---|---|---|---|---|---|---|
| | | | | 3d | 5th | 7th | 9th | 11th | 13th | 15th |
| 115 | 115.4 | 0 | 100 | 1.39 | 2.78 | 1.47 | 0.98 | 0.32 | 0.22 | 0.10 |
| 115 | 112.5 | 3.50 | 100 | 1.48 | 1.96 | 0.98 | 0.71 | 0.29 | 0.06 | 0.04 |
| 126 | 117.8 | 0 | 100 | 1.11 | 3.54 | 1.87 | 1.05 | 0.18 | 0.37 | 0.14 |
| 126 | 115.5 | 3.57 | 100 | 1.25 | 2.81 | 1.41 | 0.84 | 0.23 | 0.16 | 0.09 |

The nature of the load for this test was resistive. However, additional tests indicate that inductively reactive loads reduce the total harmonic distortion when referred to an equivalent purely resistive volt-ampere loading, all other variables being the same.

It is my belief that in producing a sinusoidal voltage at the output terminals of the ferroresonant transformer, the magnetizing current flowing through the windings 29, 30 has a certain waveshape and phase position with respect to the voltage across winding 29, 30. The waveshaping device comprised of capacitor 45 and magnetic component 35 is believed to draw a leading current with respect to the voltage across 29, 30 which current has substantially the same waveshape as the waveshape of the magnetizing current required to produce a sinusoidal voltage, the current required by the waveshaping device being substantially the mirror image of the required magnetizing current.

In order to produce this required current waveshape, it appears that the device operates in two modes during each half cycle of the voltage wave period. During the first mode, the shunts 41, 42 are apparently substantially unsaturated, and during the second mode the shunts are saturated. This means that there is a kind of switching action from the unsaturated mode to the saturated mode of operation. This switching action is not abrupt but rather gradual, the sharpness of switching being modified by the air-gaps 43 and 44.

When the device is operating in the unsaturated mode, the current waveshape which is drawn by the device is determined primarily by the series combination of the capacitor 45 and the inductance associated with the winding 40 of magnetic structure 35. The point in the cycle at which the device switches from the unsaturated mode to the saturated mode is determined by the building up of the flux which threads winding 39. As the flux threading winding 39 increases (during the unsaturated mode), it reaches a magnitude at which it saturates the shunts 41 and 42. This is because a large proportion of the flux threading winding 39 passes through the shunts 41 and 42.

When the device is operating in the saturated mode, the current waveshape drawn by the device is determined primarily by capacitor 45, the turns ratio between winding 39 and winding 40, and the amount of air gap 38.

The current drawn by the waveshaping device always leads the voltage across windings 29 and 30, and the waveshape and phase position of this current depends on (a) turns of winding 39, (b) turns of winding 40, (c) cross-sectional area and magnetic material used in shunts 43 and 44, (d) the width of air gaps 43 and 44, (e) the width of air gaps 38. These parameters result in a current for the waveshaping device which closely matches the mirror image of the magnetizing current required by the ferroresonant transformer windings 29 and 30 necessary to produce a sinusoidal output voltage.

It further appears that the current waveshape drawn by the waveshaping device to produce a sinusoidal output voltage during one portion of the cycle comprises a relatively small current as compared to its value during another portion of the cycle. That is, the current drawn by the device appears to be relatively small during the unsaturated mode of operation, and the current drawn during the saturated mode of operation appears to be relatively large. The capacitor 45 provides the proper leading phase position of the current drawn by the waveshaping device throughout both the unsaturated and the saturated modes of operation.

Since the load is in parallel with the waveshaping device, the flow of current through the load does not affect the ability of the waveshaping device to draw the desired magnetizing current waveshape from the ferroresonant transformer.

Referring again to FIGURE 2, it is often desirable to connect the finish of winding 39 to the start of winding 40 as shown by the dashed connection 47 instead of connecting the finish of winding 39 to the finish of winding 40 as shown by the solid connection.

The connection utilizing dashed line 47 is often more effective in subduing the higher harmonics than the connection using the solid line.

Referring again to FIGURE 2, if the connections to winding 39 are interchanged, that is, so that the start of winding 39 is connected to the finish of winding 30, and the finish of winding 39 is connected to the start of winding 29, it is also possible by the proper adjustment of the turns of winding 39, the turns of winding 40 and the reluctances of air gaps 38 and 43 to obtain a reduction in the harmonic content of the output voltage appearing across load circuit 46.

This connection is often more effective in subduing the higher harmonics than the connection illustrated in FIGURE 2.

Figure 3:
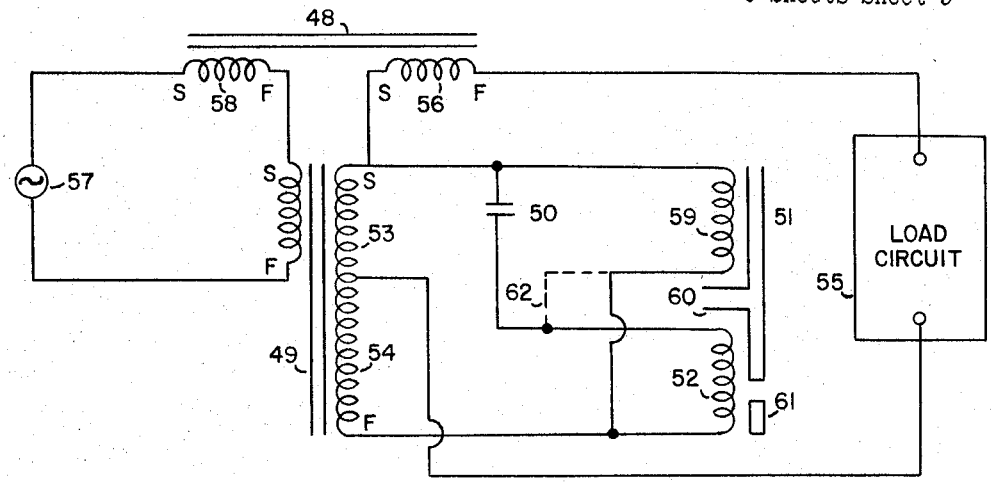
FIGURE 3 is a schematic view of a modification of the current supply circuit shown in FIGURE 2.

Another embodiment of the current supply circuit of FIGURE 1a is shown in FIGURE 3. In FIGURE 3 the ferroresonant line regulator comprises the linear or gapped inductor 48, the nonlinear or nongapped transformer 49 and the resonating capacitor 50. The waveform improvement circuit comprises transformer 51 and shares the function of capacitor 50 with the ferroresonant line regulator.

It is well known that ferroresonant line regulator depicted in FIGURE 3 behaves as far as its output and input terminals are concerned in an identical fashion to the ferroresonant line regulator depicted in FIGURE 2. Thus the combination of transformer 51 and capacitor 50 when connected as shown in FIGURE 3 perform electrically in a manner precisely as described in the circuit of FIGURE 2. That is, the voltage appearing across winding 52 of transformer 51 will be high in harmonic content being substantially proportional to the second derivative of the voltage across capacitor 50. The combination of the voltages across capacitor 50 and winding 52 will produce a substantially sinusoidal voltage across windings 53 and 54 of transformer 49. The voltage across load 55 will be the sum of the substantially sinusoidal voltage across winding 53 and the voltage across winding 56 of linear inductor 48.

The voltage across winding 56 is used as a compensating voltage in a manner similar to the function of winding 28 shown in FIGURE 2. However, in FIGURE 3 the voltage which appears across winding 56 is, in general, non-sinusoidal, although the magnitude of this voltage is usually less than ten percent of the voltage across winding 53. Because of the non-sinusoidal nature of the voltage across winding 56 it is often necessary to over-correct the voltage across winding 53 in harmonic content so that the combination of the voltages across winding 53 and 56 will tend to cancel their harmonic components and thus still produce a substantially sinusoidal voltage across load circuit 55. This over-compensation can be effected through adjustments of the number of turns of windings 59 or 52 of transformer 51; adjustments of the airgaps 60 and 61 of transformer 51; or by use of the alternate connection 62 (as explained in the discussion of FIGURE 2) or a combination of these methods.

Figure 4:
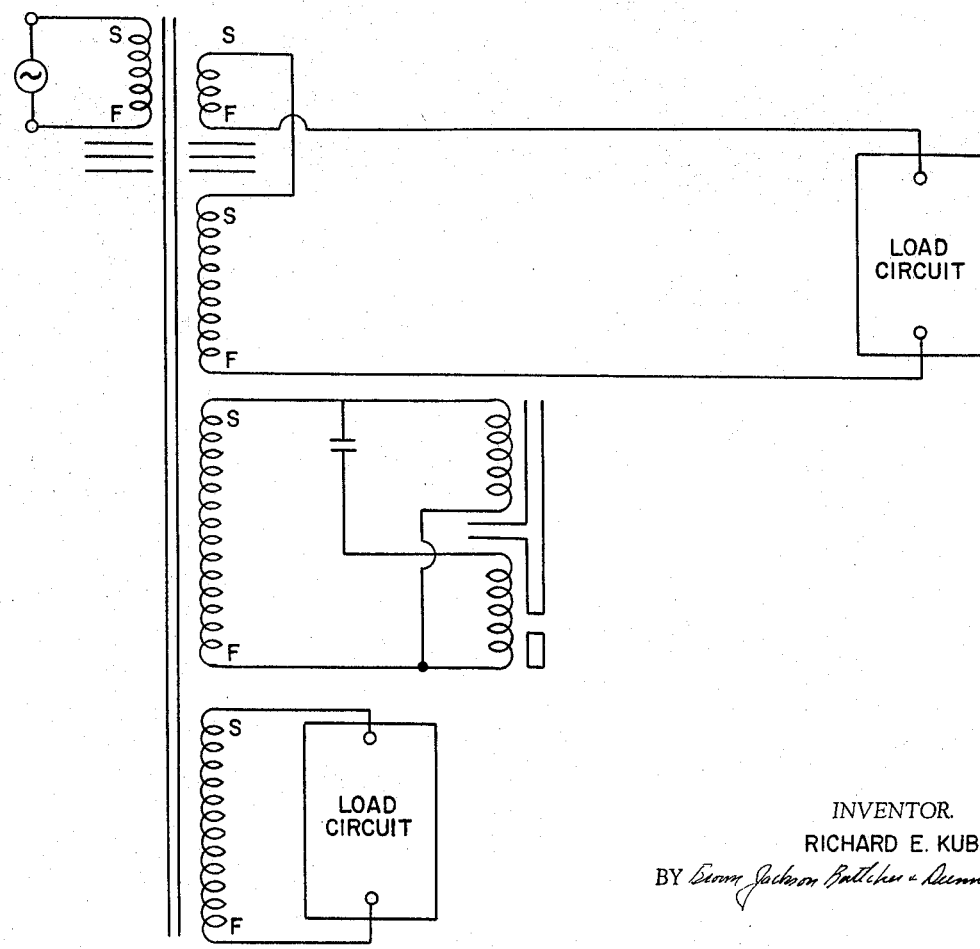
FIGURES 4 to 7 inclusive, are schematic views of modifications of the current supply circuit depicted in FIGURE 2.

A modification of the current supply circuit of FIGURE 2 is shown in FIGURE 4. The difference between FIGURE 4 and FIGURE 2 are these:

(1) The circuit of FIGURE 4 has more than one output, each output feeding its individual load.

(2) The load circuits of FIGURE 4 are electrically insulated from each other and from the waveform improvement circuit, providing a safety feature in that the high voltage of the capacitor is isolated from all of the load circuits. Additionally, the load circuits may be independently grounded.

(3) The compensating winding may or may not be used in combination with an output winding.

Figure 5:
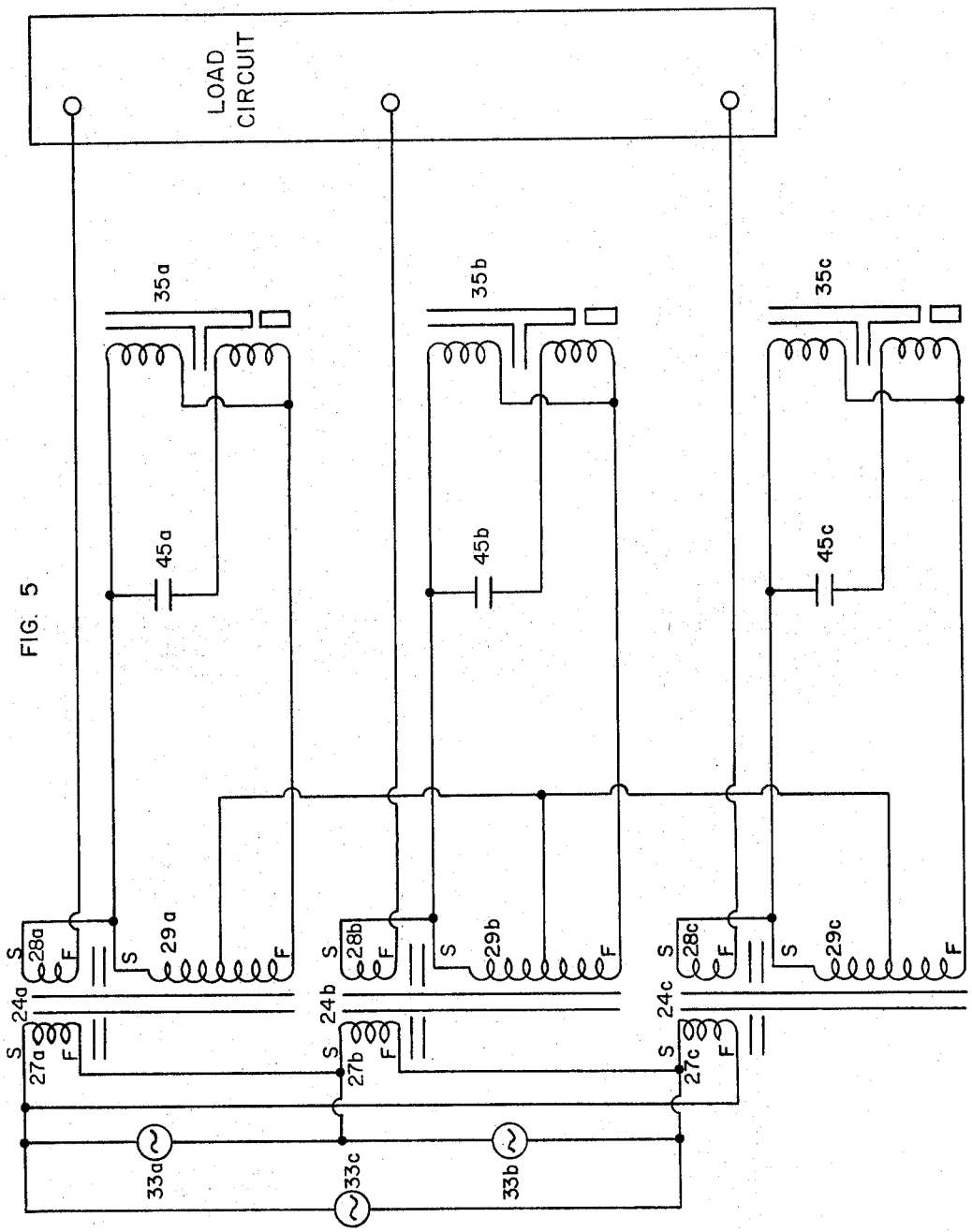

The principle of the invention would apply to regulators energized from polyphase sources of alternating current, as in the embodiment of the invention shown in FIGURE 5, for example.

FIGURE 5 depicts a modification of the invention shown in FIGURE 2 adapted for three-phase operation. There are provided three ferroresonant voltage regulators 24a, 24b, and 24c, each like the regulator 24 of FIGURE 2.

The windings 27a, 27b, and 27c, of the ferroresonant regulators, respectively, are connected in a delta configuration to the phases 33a, 33b, and 33c, respectively, of a three-phase commercial source of alternating current. There are provided three transformers 35a, 35b, and 35c and three resonating capacitors 45a, 45b, and 45c connected in each phase in the same manner as shown in FIGURE 2. The three output windings 29a, 29b, and 29c with their repective series connected compensating windings 28a, 28b, and 28c are connected into a star configuration and feed a load circuit 46 which may, for example, be both resistive and reactive.

Figure 6:
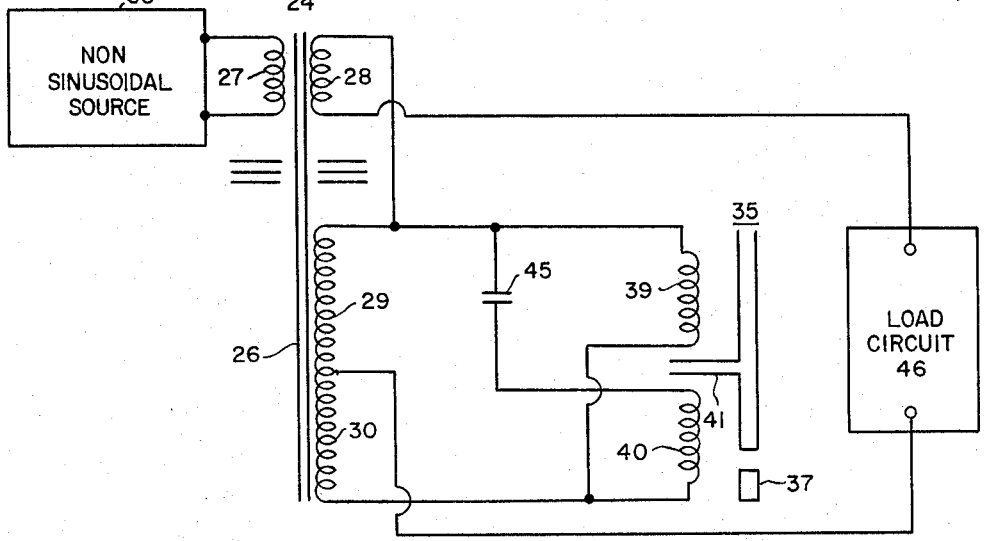
Figure 7:
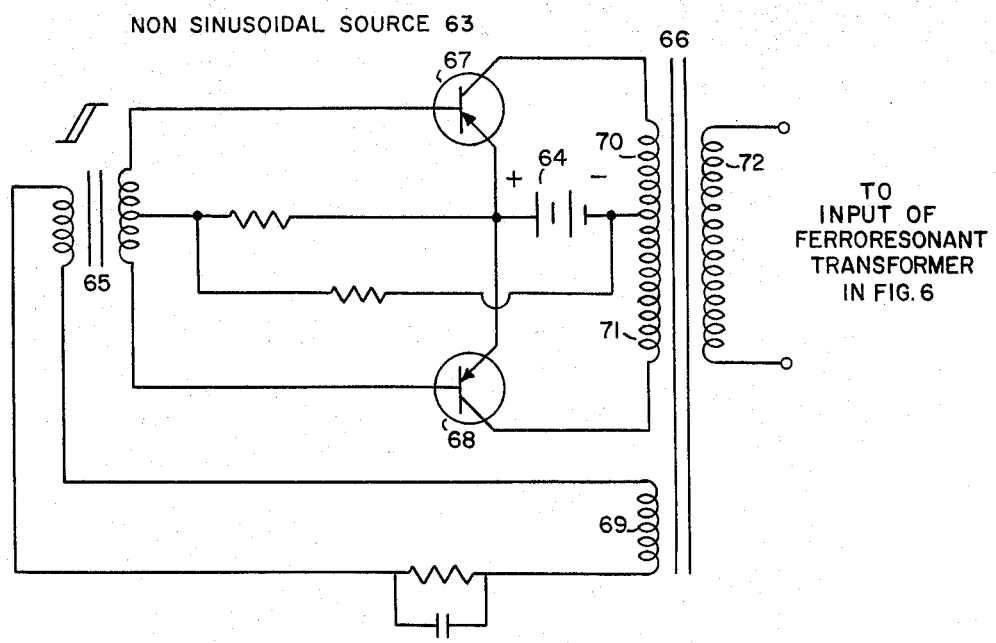

Another modification of the current supply circuit of FIGURE 2 is shown in FIGURE 6. In FIGURE 6, the ferroresonant line regulator 24 is fed from a supply source 63 producing at its output terminals a voltage having a waveform which is substantially non-sinusoidal, that is, containing a plurality of harmonic components. An example of one such supply source is shown in FIGURE 7. FIGURE 7 depicts a well-known type of transistorized square-wave inverter circuit. In FIGURE 7, there is provided a source of direct current 64 which acts as the energy source for the inverter. The frequency of the inverter is determined primarily from the saturation characteristic of transformer 65 which has a core having a substantially square loop hysteresis curve. PNP transistors 67 and 68 alternately conduct and nonconduct current from source 64 through, respectively, windings 70 and 71 of transformer 66 which does not saturate. The secondary winding 72 of transformer 66 is connected to the input winding 27 of the ferroresonant transformer 24 shown in FIGURE 6. The voltage appearing across winding 72 of transformer 66 of FIGURE 7 which will be identical to the voltage across winding 27 of transformer 24 of FIGURE 6 will be substantially a rectangular alternating voltage waveform. Under proper adjustment, the circuit of FIGURE 6 will still provide a substantially sinusoidal waveform at its output terminals even though the input waveform to winding 27 of transformer 24 is a rectangular waveform. The following chart presents test data illustrating the improvement in harmonic content of the output voltage of the circuit of FIGURE 6 when the input voltage to winding 27 of transformer 24 was substantially a rectangular waveform generated by a transistorized inverter circuit like the transistorized inverter of FIGURE 7. The maximum values of the harmonic components of the input and output voltages of the circuit of FIGURE 6 are expressed as a percentage of the maximum value of the fundamental component of these respective voltages taken arbitrarily as 100 percent.

|  | Percent Fundamental | Percent | | | | | | | | |
|---|---|---|---|---|---|---|---|---|---|---|
|  |  | 2d | 3d | 4th | 5th | 6th | 7th | 8th | 9th | 11th |
| Input Rectangular Wave | 100 | 1.62 | 37.5 | 0.52 | 21.10 | 0.30 | 14.31 | ------ | 11.7 | 8.75 |
| Output Wave | 100 | 1.83 | 1.38 | 0.31 | 1.38 | ------ | 0.55 | ------ | 0.04 | 0.32 |

This data was taken with a resistive load. The circuit of FIGURE 6, of course, still maintains its good regulation characteristics for substantial changes in the magnitude of the input voltage or for substantial changes in the impedance of the load circuit.

It should also be noted in reference to FIGURE 2, that if connections of winding 40 of transformer 35 are reversed so that the harmonics generated in winding 40 are additive to the harmonics present in the voltage across capacitor 45 (instead of being subtractive), then the harmonic content of the output voltage will be substantially augmented. Moreover, it is feasible through the proper design of transformer 35 to enhance the harmonics to such an extent that the output voltage has a substantially rectangular waveform. With these modifications, the circuit of FIGURE 2 could be used to provide alternating current power at high efficiency having a regulated and substantially rectangular output waveform derived from a substantially sinusoidal input waveform.

The waveform improvement transformer of the invention as well as being incorporated into new systems may be conductively connected to existing systems to provide reduction of the harmonic content in the output thereof, thus providing a flexible arrangement which can result in cost savings since the addition of the waveform improvement transformer to an existing system is more economical than replacement of the existing ferroresonant transformer by a more sophisticated transformer.

While only particular embodiments of the invention have been described and illustrated, it is apparent that modifications and alterations may be made therein. Accordingly, it is the invention in the appended claims to cover all such modifications and alterations as my fall within the true spirit and scope of the invention.

What is claimed is:

1. In a current supply apparatus for providing a substantially sinusoidal, harmonic-free output voltage waveform to a load from an alternating current supply source comprising a ferroresonant transformer having a plurality of frequency components, a transformer comprising a core, a primary winding including input means for connecting said primary winding to said supply source, a secondary winding on said core, a first high reluctance magnetic path including shunt means magnetically disposed between said primary and secondary windings, and a second high reluctance magnetic path including means disposed to provide a magnetic return path for magnetic flux which links said secondary winding, capacitor means, means connecting said capacitor means in series with said secondary winding, and means connecting said capacitor means and said secondary winding across said source.

2. An apparatus as set forth in claim 1 in which said last means comprises conductor means for providing a conductive connection between said source and the series circuit including said secondary winding and said capacitor means.

3. In a current supply apparatus for providing a substantially sinusoidal harmonic-free output voltage waveform to a load from an alternating current supply source comprising a ferroresonant transformer having a plurality of frequency components, a transformer including a core comprising a plurality of E-shaped laminations, a primary winding wound on said core including input means for connecting the primary winding to said supply source, a secondary winding on said core, a first high reluctance magnetic shunt path including shunt means magnetically disposed between said primary and secondary windings comprising a plurality of I-shaped laminations butt jointed at the center leg of the E-shaped laminations, and disposed with the major axis thereof extending transversely to the direction of the center leg of the E-shaped laminations to provide nonmagnetic gaps with the outer legs of the E-shaped laminations, and a second high reluctance magnetic path, including a plurality of I-shaped laminations disposed in spaced relation with the ends of said E-shaped laminations to provide a magnetic return path for magnetic flux which links said secondary winding, a capacitor, means connecting said capacitor in series with said secondary winding, and means for connecting said series circuit to said source.

4. In a current supply apparatus for providing a substantially sinusoidal harmonic-free output voltage waveform to a load from an alternating current supply source comprising a ferroresonant transformer having a plurality of frequency components, a transformer comprising a core, a primary winding including input means for connecting the primary winding to said supply source, a secondary winding on said core, a first high reluctance magnetic path including shunt means magnetically disposed between said primary and secondary windings, and a second high reluctance magnetic path including means disposed to provide a magnetic return path for magnetic flux which links the secondary winding, capacitor means, means for connecting said capacitor means in a series circuit with said secondary winding, the value of the components of said transformer and said capacitor means being such as to provide harmonic voltages in said secondary winding which substantially cancel the like harmonic voltages which appear across said capacitor means, and an output circuit including said load connected to said source and in shunt of the series circuit.

5. An apparatus as set forth in claim 4 in which said source includes a ferroresonant transformer for providing voltage waveforms to said load.

6. An apparatus as set forth in claim 4 in which said secondary winding on said transformer is connected to provide a voltage which subtracts from the voltage across said capacitor means.

7. An apparatus as set forth in claim 4 in which said secondary winding on said transformer is connected to provide a voltage which is additive to the voltage across said capacitor means.

8. In a current supply apparatus for providing a substantially constant sinusoidal harmonic-free output voltage waveform to a load, said apparatus including a ferroresonant transformer having at least a primary winding including means for connecting the primary winding to an alternating current source, a secondary winding including a tapped section, circuit means for connecting said load across said tapped section of said secondary winding, a second transformer comprising a core, a primary winding including input means for connecting the primary winding across at least a portion of said secondary winding on said ferroresonant transformer, a secondary winding on said core, a first high reluctance magnetic path including shunt means magnetically disposed between said primary and secondary windings on said core, and a second high reluctance magnetic path including means disposed to provide a magnetic return path for magnetic flux which links said secondary winding on said core, capacitor means, means connecting said capacitor means in series with said secondary winding on said core, and means connecting said capacitor means and said secondary winding on said core across at least a portion of said secondary winding on said ferroresonant transformer.

9. An apparatus as set forth in claim 8 in which said ferroresonant transformer includes a compensating winding, and in which said circuit means includes means connecting said compensating winding in opposition to the voltage output of said ferroresonant transformer and said second transformer.

10. An apparatus as claimed in claim 8 in which said ferroresonant transformer includes a compensating winding, and a gapped inductance means for coupling said primary winding and said compensating winding, and in which said circuit means includes means connecting said compensating winding in opposition to the voltage output of said ferroresonant transformer and said second transformer.

11. An apparatus as set forth in claim 4 in which said source to a ferroresonant transformer and said load is a three phase load, and which includes two additional ferroresonant transformers and an additional one of said transformers for each of said ferroresonant transformers, and circuit means connecting the primary windings of said ferroresonant transformers in a delta configuration to the different phases of a three phase source of alternating current, and means connecting the output of said ferroresonant transformers in a star configuration to the different conductors of the three phase load.

12. A current supply apparatus as set forth in claim 8 which includes means connecting the start end of said primary winding on said core to the start end of said secondary winding on said ferroresonant transformer, and means connecting the terminating end of said primary winding on said core to the terminating end of said secondary winding on said ferroresonant transformer.

13. In a current supply apparatus for providing a substantially constant sinusoidal harmonic-free output voltage waveform to a load, said apparatus including a ferroresonant transformer having at least a primary winding and a secondary winding including means for connecting the primary winding to an alternating current source, a second transformer comprising a core, a primary winding including input means for connecting the start end of said primary winding to the terminating end of said secondary winding on said ferroresonant transformer and the terminating end of said primary winding on said core to the start end of said secondary winding in said ferroresonant transformer, a secondary winding on said core, a first high reluctance magnetic path including shunt means magnetically disposed between said primary and secondary windings on said core, and a second high reluctance magnetic path, including means disposed to provide a magnetic return path for magnetic flux which links said secondary winding on said core, capacitor means, means connecting said capacitor means in series with said secondary winding on said core, and means connecting said capacitor and said secondary winding on said core across at least a portion of said secondary winding on said ferroresonant transformer.

14. In a current supply apparatus for providing a substantially sinusoidal harmonic-free output voltage waveform to a plurality of different load circuits, said apparatus including a ferroresonant transformer having a core having at least a primary winding and a plurality of secondary windings, means for connecting said primary winding to a source of alternating current, circuit means for connecting one of said secondary windings to one of said load circuits, a second transformer comprising a core having a primary winding and a secondary winding, a first high reluctance magnetic shunt disposed between said primary and secondary windings for said second transformer and a second high reluctance magnetic path including means disposed to provide a magnetic return path for magnetic flux which links the secondary winding of said second transformer, capacitor means, means connecting said capacitor means in series with said secondary winding on said second transformer, and means connecting said series circuit and said primary winding of said second transformer across a second one of said secondary windings.

15. An apparatus as set forth in claim 14 in which the secondary windings other than said secondary winding on said second transformer include means for connecting the output thereof to a different load circuit.

16. In a current supply apparatus for providing a substantially constant sinusoidal harmonic-free output voltage waveform to a load comprising an inverter circuit operative to provide rectangular shaped waveform signals in a cyclic manner, a ferroresonant transformer having at least a primary winding including means for connecting the primary winding to said inverter source, at least one secondary winding, a second transformer comprising a core, a primary winding including input means for connecting the primary winding across at least a portion of said secondary winding on said ferroresonant transformer, a secondary winding on said core, a first high reluctance magnetic path including shunt means magnetically disposed between said primary and secondary windings on said core, and a second high reluctance magnetic path, including means disposed to provide a magnetic return path for magnetic flux which links said secondary winding on said core, capacitor means, means connecting said capacitor means in series with said secondary winding on said core, and means connecting said capacitor means and said secondary winding on said core across at least a portion of said secondary winding on said ferroresonant transformer.

17. In a current supply apparatus for providing a substantially constant sinusoidal harmonic-free output voltage waveform from a three phase source to a three phase load, said apparatus including a plurality of ferroresonant transformers each of which includes input means for connecting its ferroresonant transformer to a different phase of said alternating current source, a waveform correcting circuit for each of said ferroresonant transformers, each of which includes a transformer comprising a core, a primary winding including input means for connecting the primary winding to the output of its associated ferroresonant transformer, a secondary winding on said core, a first high reluctance magnetic path including shunt means magnetically disposed between said primary and secondary windings on said core, and a second high reluctance magnetic path including means disposed to provide a magnetic return path for magnetic flux which links the secondary winding, capacitor means, means for connecting said capacitor means in a series circuit with the secondary winding of the transformer in the waveform connecting circuit, and means connecting said series circuit to the output of its associated ferroresonant transformer and means connecting said output circuits to the different conductors of the three phase load in a star configuration.

18. A current supply apparatus including an alternating current supply source comprising a ferroresonant transformer for providing signals in a cyclic manner having a plurality of frequency components, a variable load, waveform correction means controlled by said signals for providing a substantially sinusoidal harmonic-free output voltage waveform to said load including a transformer comprising a core, a primary winding on said core, a secondary winding on said core, a first high reluctance magnetic path including shunt means magnetically disposed between said primary and secondary windings, and a second high reluctance magnetic path including means disposed to provide a magnetic return path for magnetic flux which links said secondary winding, capacitor means, means connecting said capacitor means in series circuit with said secondary winding, means connecting said series circuit and said primary winding in parallel to said source to adjust the waveshape output therefrom, and an output circuit including said load coupled to said source to receive the corrected waveform.

19. A current supply apparatus for a variable load from a nonsinusoidal source including a ferroresonant transformer for providing nonsinusoidal output signals, means coupling the output of said source to said load, waveshaping means for adjusting said nonsinusoidal signals provided by said source to a substantially sinusoidal harmonic free output voltage waveform for said load including a transformer comprising a core, a primary winding on said core, a secondary winding on said core, a first high reluctance magnetic path including shunt means magnetically disposed between said primary and secondary windings, a second high reluctance magnetic path including means disposed to provide a magnetic return path for magnetic flux which links said secondary winding, capacitor means, means connecting said capacitor means in series circuit with said secondary winding, and means coupling said primary winding and said series circuit in parallel to said source.

References Cited by the Examiner

UNITED STATES PATENTS

| 2,694,177 | 11/1954 | Sola | 323—60 |
| 2,753,512 | 7/1956 | Helterline, et al. | 323—45 |
| 2,858,455 | 10/1958 | Trabut | 323—56 |
| 2,930,964 | 3/1960 | Goodman | 323—48 |
| 2,992,386 | 7/1961 | Rosin | 323—56 X |
| 3,022,458 | 2/1962 | Sola | 323—45 |
| 3,061,769 | 10/1962 | Smyth | 323—60 X |

JOHN F. COUCH, *Primary Examiner.*

LLOYD McCOLLUM, *Examiner.*

J. M. THOMSON, W. E. RAY, *Assistant Examiner.*